Sept. 17, 1957 — A. K. FINSTAD — 2,806,708
COLLAPSIBLE HAND TRUCK
Filed May 21, 1954
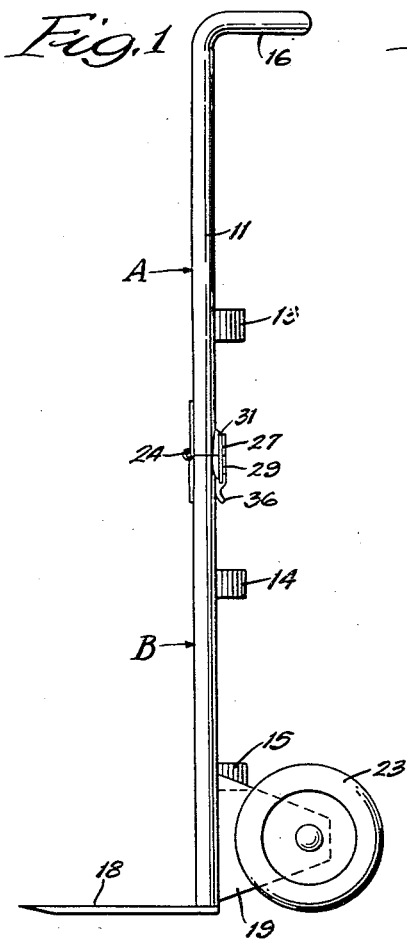
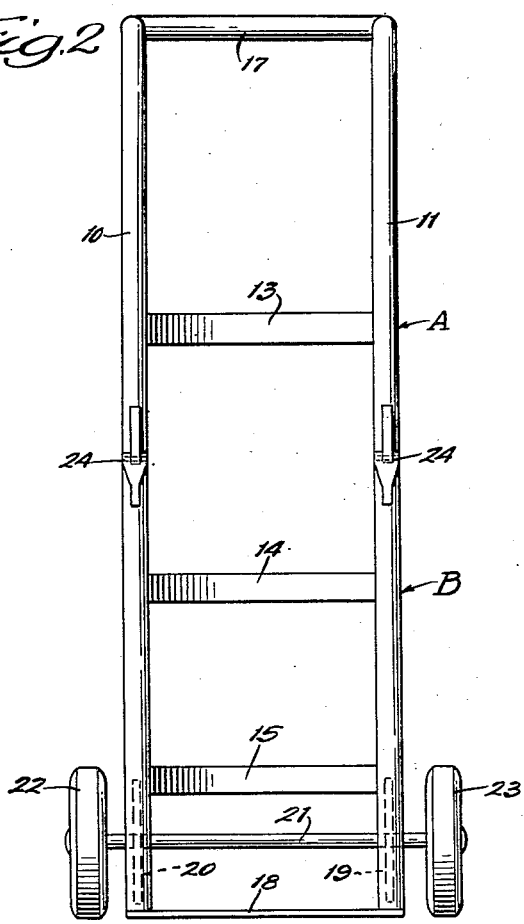
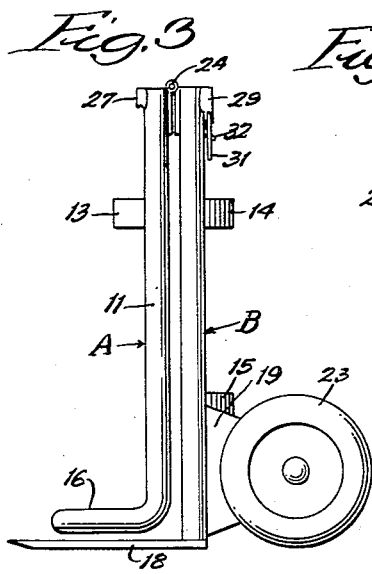
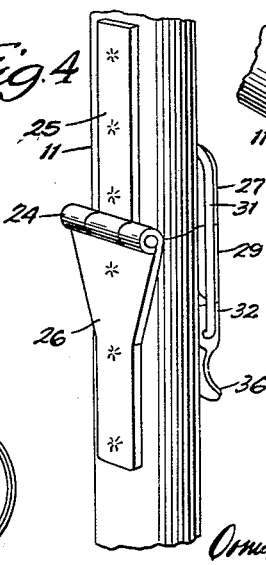
INVENTOR:
Arthur K. Finstad,
BY Orme, McDougall, Williams & Kirch,
ATTORNEYS.

United States Patent Office 2,806,708
Patented Sept. 17, 1957

2,806,708

COLLAPSIBLE HAND TRUCK

Arthur K. Finstad, Chicago, Ill.

Application May 21, 1954, Serial No. 431,399

1 Claim. (Cl. 280—36)

This invention relates to an improvement in hand trucks and it relates more particularly to a collapsible hand truck adapted to be easily and efficiently adjusted between collapsed and open position and which, when in collapsed position, occupies very little space for storage and which, when in open position, embodies rigidity sufficient to enable normal use thereof in transportation of heavy loads and it is an object of this invention to produce a hand truck of the type described.

More specifically, it is an object of this invention to produce a hand truck which is capable of being collapsed into a small portable unit for storage in the baggage compartment of a vehicle or the like or for utilization of less space in storage within a building or home for use in the conveyance of heavy objects; which is easily adjusted from collapsed position into a strong and rigid conveyor for use in the transportation of heavy objects; which is sturdy in construction and efficient in operation, and which embodies means for retaining the elements in position of use without fear of collapse and without reliance on additional elements for support.

These and other objects and advantages of this invention will hereinafter appear and for purposes of illustration, but not of limitation, an embodiment of the invention is shown in the accompanying drawing in which—

Figure 1 is a side elevational view of a hand truck embodying features of this invention;

Figure 2 is a front elevational view of the hand truck shown in Figure 1;

Figure 3 is a side elevational view of the hand truck shown in Figure 1 in collapsed position;

Figure 4 is a fragmentary perspective view of a portion of the frame members adapted for folding, and Figure 5 is a perspective view of the portion of the frame member shown in Figure 4 with the elements partially displaced towards collapsed position.

Briefly described, the concepts embodying features of this invention reside in a hand truck formed of a pair of laterally spaced elongate, rigid frame members 10 and 11 which may be in the form of elongate elements of rigid high strength material but preferably are formed of tubular metal members or the like fixed in predetermined laterally spaced apart relation by a number of vertically spaced, horizontally disposed cross-brace members 13, 14 and 15 secured at their ends respectively to the rear walls of the frame members 10 and 11 between which they extend.

The upper end portions of the frame members are formed into handle portions as by means of turning the ends curvilinearly rearwardly but it is preferred to make use of an endless tubular member as the frame elements having their upper end portion turned rearwardly to form rearwardly extending sections 16 with an integral horizontally extending portion 17 in between to form a handle bar.

Fixed to the frame members to extend forwardly substantially perpendicularly from the lower edge portion thereof is a platform 18 upon which the objects to be conveyed are supported. Brackets 19 and 20 extending rearwardly in parallel relation from the frame members 10 and 11 adjacent the lower edge portion are formed with openings in registry one with the other for receiving a horizontally disposed axle 21 upon which wheels 22 and 23 are supported for free rotational movement. The wheels are preferably positioned on portions of the axle 21 extending laterally beyond the frame members 10 and 11.

It will be understood that the shape of the platform or apron 18 may be varied and that more than two vertically disposed parallel frame members may be employed in the construction of the hand truck, or that the number and types of cross-brace members may be increased or decreased but it is preferred to locate the wheels 22 and 23 closely adjacent the frame members and the lower portion thereof to provide a favorable pivotal relationship which enables the hand truck to be rocked rearwardly onto the wheels with a substantial load on the apron for conveyance by rolling from station to station. With such construction, it is possible to position heavy loads upon the platform while the platform rests substantially flush with the surface of the floor and then to tip the hand cart rearwardly onto the wheels for resting the objects to be conveyed on the apron and on the side frame members to support the load while rolling the cart about on its wheels.

In order to adapt the hand truck for the occasional use to which it is put in the home or on the farm or with an automotive vehicle, it is desirable to be able to reduce the size of the unit for storage without utilization of excessive space or for concealment within the truck of an automotive vehicle or the like.

It is important, however, to achieve such collapsibility in the structure without sacrifice of its load carrying capacity, strength or its rigidity in operation and it is desirable further to secure such flexibility in use in a simple and efficient manner.

These characteristics have been embodied in a structure of the type described by sectioning the vertically disposed frame members 10 and 11 across an intermediate portion thereof at the same level into an upper section A which includes the handle 17 and a lower section B which includes the wheels and the platform with the length of the upper section A being slightly less than the length of the lower section B. The sections are pivotally secured one to the other by means of a hinge 24 having its axis of turning movement horizontally disposed and in alignment with the parting line between the sections across the front of the frame members with one arm 25 of the hinge fixed, as by welding, to the adjacent front wall portion of the upper section and the other arm 26 of the hinge fixed to the adjacent front wall portion of the lower section. Each frame member is similarly hinged for rocking movement together about a common axis. By this construction, it is possible to make use of the contacting relation of the frame members themselves positioned rearwardly of the hinged portion to brace the respective sections one upon the other for rigidity and strength in use by tilting the truck rearwardly onto the wheels with a load thereon and in use for carrying the load by actuation of the wheels.

To prevent separation at the hinged portion when the direction of the load is reversed upon tilting the truck, other means interconnecting the adjacent edge portions of the frame members along the rear walls is also provided. As illustrated more specifically in Figures 4 and 5, a preferred interlocking means comprises a metal plate 27 fixed to the rear wall of one of the frame members 10 and 11 with the edge portion of the plate flush with the end of the frame member and formed with a vertically extending groove 28 in the end wall. Another plate 29 is fixed to the rear wall of the other frame member with the edge portion flush with the end of the frame member having an outwardly extending tongue 30 adapted to be received within the groove 28 when the plate members are brought together in end to end relation as the frame members are pivoted on the hinges to operative position. The tongue and groove arrangement insures proper registration between the members.

The plates are latched together in their interfitting relation by locking means such as a bail 31 which is pivoted on an intermediate portion of a latching arm 32 which is pivoted at one end offset from the bail pivot on a pin 33 extending crosswise between a yoke 34 which is formed on the end of one of the plates. The opposite outer end portion of the other plate 27 is formed with a groove 35 extending crosswise to receive the end of the bail in seating relation. The free end of the latching arm 32 is formed with a tab 36 for manual actuation of the latching arm about its pivot. The bail 31 is dimensioned to have a length which clears the opposite end of the other plate when the latching arm is in its upper position of adjacent and firmly and resiliently to seat within the groove 35 of the other plate when the latching arm is rocked in the direction to displace the bail in the direction away from the plate for locking the frame members together.

When it is desired to collapse the hand truck for storage, the latching arm 36 is rocked upwardly to lift the bail 31 out of the groove 35 so that the bail can be displaced to free the other plate. The other frame section is then free for rocking movement forwardly about its pivot to the collapsed position shown in Figure 3 with the upper frame member A lying adjacent the forward wall of the lower frame member B and with the handle 17 nesting adjacent the platform 18.

When it is desired to reassemble the hand truck for use, it is only necessary to rock the upper frame member A upwardly about its pivot until the adjacent ends of the tubular frame members come into contacting relation with each other to form a rigid support. The bail 31 and the latching arm 32 are rocked upwardly so that the end of the bail will clear the opposite end of the plate 27 and align with the groove 35 into which it becomes seated resiliently as the latching arm 32 is displaced downwardly against the underlying portion of the frame member, preferably offset inwardly from its pivot by a slight amount to urge the lever resiliently against the rear wall of the frame member thereby to militate against inadvertent displacement forwardly for unlatching.

It will be understood that changes may be made in the details of construction, arrangement and operation and that the feature of collapsibility and rigidity in open position for use may be adapted to other structural elements forming the frame members of a hand truck, without departing from the spirit of the invention, especially as defined in the following claim.

I claim:

A hand truck, comprising an upper pair and a lower pair of tubular members, the tubular members of each pair being rigidly fixed one to another in equally spaced apart relation, the lower end of each of the members of the upper pair and the upper end of each of the members of the lower pair being formed flat and square so as to meet in abutting relation all around when said upper and lower members are arranged in end to end relation, a platform extending forwardly substantially perpendicularly from the lower end of the lower pair of tubular members, wheels connected to and extending rearwardly from the lower end portion of the lower pair of members and rotatable about an axis slightly above the level of the platform, a handle portion extending rearwardly from the upper end of the upper pair of tubular members, coaxial pivotal connections between the lower ends of the upper pair of tubular members and the upper ends of the lower pair of tubular members, said pivotal connections having a common axis parallel to the plane formed between the tubular members and in alignment with their meeting edges across the front thereof to enable the upper pair of tubular members to be rocked forwardly about the pivotal connections to overlap the members of the lower pair forwardly thereof in collapsed position, and a pair of latching means on the back walls of the tubular members adjacent their meeting edges for locking the upper with the lower members across their rear walls to prevent pivotal movement of the members to collapsed position, each of said latching means including a toggle lever pivotally mounted on the back wall of one of said tubular members for swinging movement about an axis adjacent the end of said member, a toggle link pivotally connected to said toggle lever at a point spaced outwardly from the axis of said lever by an amount less than the length of said link, and an abutment on the mating tubular member for engagement by said toggle link, said abutment and said toggle link having interengageable hook and eye elements thereon to form a disengageable connection therebetween, said toggle lever being swingable into geenrally parallel relation to its supporting tubular member to apply tension to the toggle link and draw the mating tubular members together into their erected relation.

References Cited in the file of this patent

UNITED STATES PATENTS

| | | |
|---|---|---|
| 1,215,771 | Brown | Feb. 13, 1917 |
| 1,242,418 | Booth | Oct. 9, 1917 |
| 1,477,692 | Christophil | Dec. 18, 1923 |
| 1,481,223 | Gorman et al. | Jan. 15, 1924 |
| 1,503,462 | Alpert | Aug. 5, 1924 |
| 2,450,304 | Shiflet | Sept. 28, 1948 |
| 2,490,189 | Alexander | Dec. 6, 1949 |

FOREIGN PATENTS

| | | |
|---|---|---|
| 777,422 | France | Nov. 26, 1934 |